March 30, 1937.  E. SCHEEMAEKER  2,075,665
CREAM SEPARATOR
Filed May 18, 1936  2 Sheets-Sheet 1
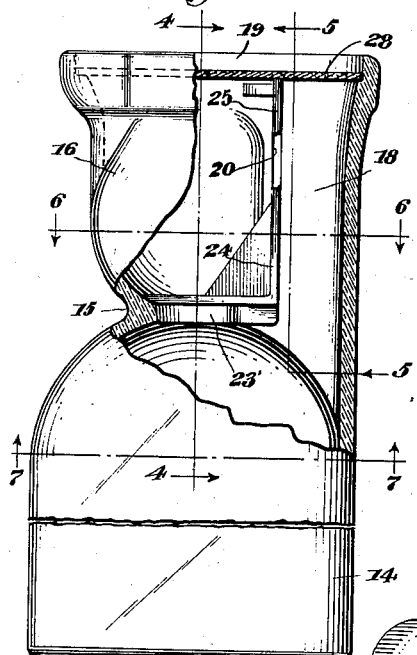
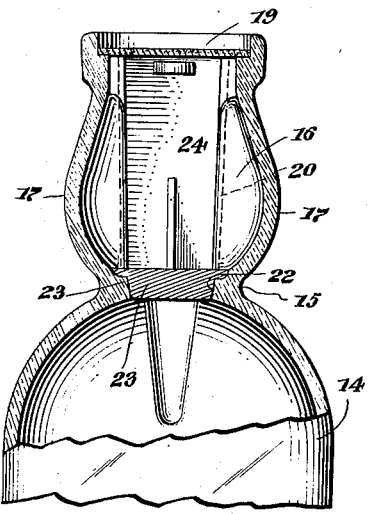
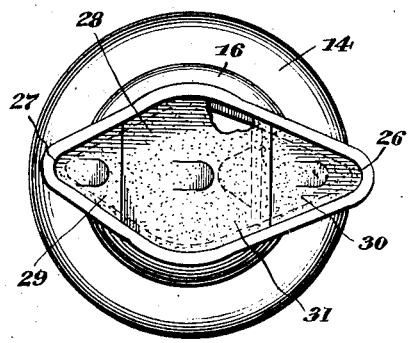
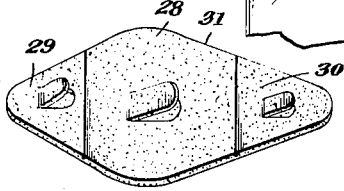
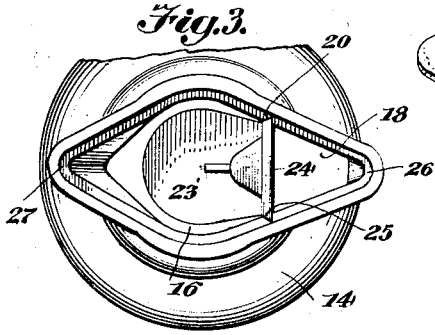
Inventor
EMILE SCHEEMAEKER
By
*[signature]*
Attorney March 30, 1937.   E. SCHEEMAEKER   2,075,665
CREAM SEPARATOR
Filed May 18, 1936   2 Sheets-Sheet 2

Inventor
EMILE SCHEEMAEKER
By
Attorney

Patented Mar. 30, 1937

2,075,665

UNITED STATES PATENT OFFICE 2,075,665

CREAM SEPARATOR

Emile Scheemaeker, Blackstone, Mass.

Application May 18, 1936, Serial No. 80,422

4 Claims. (Cl. 215—6)

The present invention relates to a cream separating device for use with a specialized milk bottle.

One object of the invention is to provide a novel device whereby either cream or milk, at the selection of the user, may be poured from the bottle.

Another object is to provide such a device which is extremely inexpensive.

Still another object is to provide means whereby the device may be positively positioned in the bottle.

In the accompanying drawings:

Figure 1 is an elevation partly broken away showing the device in position in a milk bottle.

Figure 2 is a top plan view showing the closure applied to the bottle.

Figure 3 is a similar view with the closure removed.

Figure 4 is a sectional view on the line 4—4 of Figure 1.

Figure 5 is a sectional view on the line 5—5 of Figure 1.

Figure 8 is a perspective view of the separating device.

Figure 9 is a perspective view of the closure.

Figure 6:
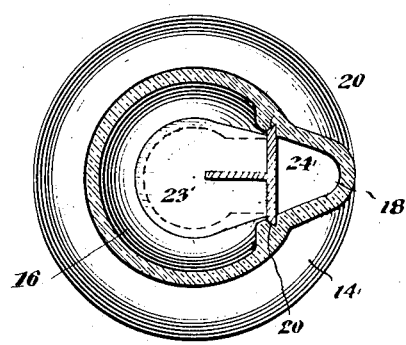
Figure 6 is a sectional view on the line 6—6 of Figure 1.
Figure 7:
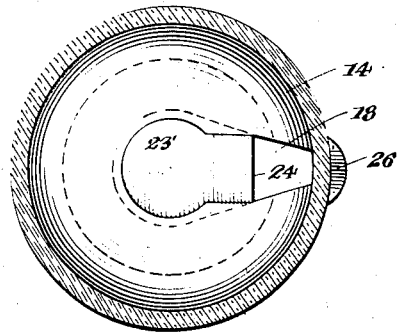
Figure 7 is a sectional view on the line 7—7 of Figure 1.

Describing the drawings more particularly, a milk bottle having a body portion 14 is shown. Superposed on the body 14 and connected therewith by a necked-in portion 15, is a cream chamber designated generally 16. The cream chamber 16 may be of any desired shape and may advantageously be formed with outwardly bowed side walls 17 on three sides. On the fourth side the walls are extended outwardly, roughly in the form of a V, to form a channel 18 that extends from the body 14 upwardly to the mouth 19 of the bottle, which is also the mouth of the cream chamber.

Figure 10:
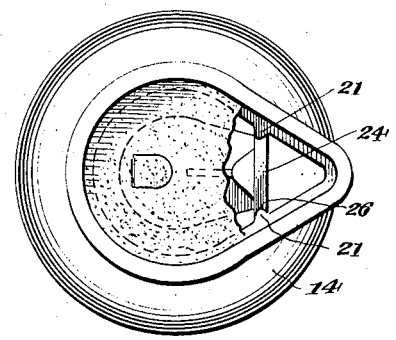
Figure 10 is a plan view of a modified form of bottle with which the device may be used, and showing a modified form of guiding means.
Figure 12:
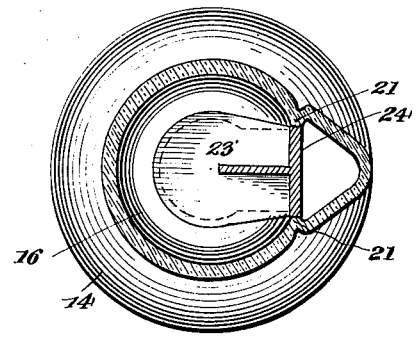
Figure 12 is a sectional view on the line 12—12 of Figure 11.

The wall of the neck is formed to provide guide means, preferably as shown, adjacent the open side of the channel 18. As shown in Figures 1, 4, 5 and 6, these guides may be in the form of grooves 20 formed in the material of the side walls, or as shown in the modification of Figures 10 and 12 they may be in the form of outwardly extending ribs 21.

In the interior of the necked-in portion 15 is an opening 22 connecting the interior of the body 14 with the cream chamber 16. The material about the opening 22 is preferably provided with shoulders 23 forming a valve seat.

Figure 11:
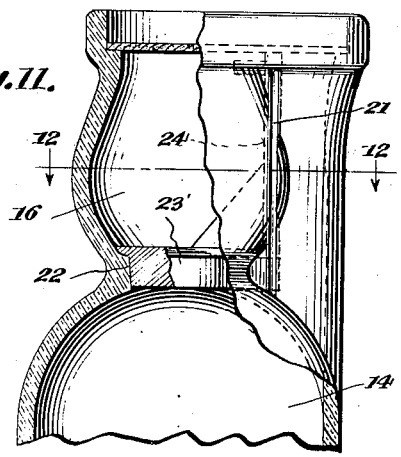
Figure 11 is a sectional elevation of the modified form.
Figure 13:
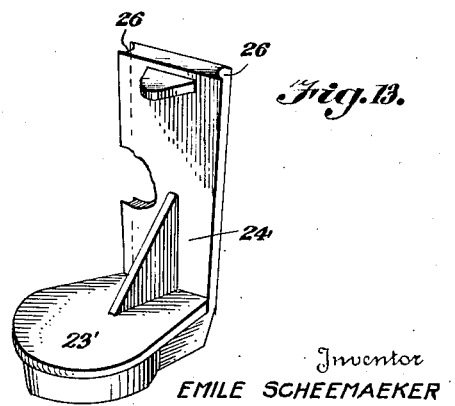
Figure 13 is a perspective view of the device for use with a bottle having the modified guiding means.

A separator device for use with the above described bottle is composed of a bottom member 23 and an upwardly extending side wall 24. The bottom member 23 is formed to engage the valve seat about the opening 22 and to effectively stop communication between the cream chamber 16 and the body 14 of the bottle. The upstanding side wall 24 is of proper width and shape to completely close off the channel 18 from the cream chamber 16. When the separator is inserted in the bottle the edges of the wall 24 are suitably shaped to engage the guide means at either side of the channel. Thus the edges 25 of the wall 24 shown in Figure 8 are extended to closely engage the sides of the grooves 20 while the form shown in Figure 13 has channeled edges 26 to closely engage the ribs 21 of the bottle shown in Figures 10 to 12.

The bottle may have a mouth of any desirable shape. Thus the form shown in Figures 1 to 5 inclusive is diamond-shaped, and the apices form pouring lips 26 and 27 for the channel 18 and chamber 16, respectively. The mouth of the bottle shown in Figures 6-12 inclusive is rounded on the cream chamber side, and the mouth of the channel is in the form of a V, which serves as a pouring lip.

In order to enable either milk or cream to be poured from the bottle when the separator has been inserted, a closure 28 is provided that has flap portions 29 and 30 that are hingedly connected to a body portion 31, and that may be raised to open either the passage or the chamber.

The separator is intended to be inserted in the neck of the bottle after the cream has risen into the cream chamber. Then by positioning the closure in the mouth of the bottle, the device is ready for use and cream or milk may be poured from the bottle at the selection of the user. The guides, besides serving to guide the separator to its proper place with the bottom wall effectively closing the opening between the cream chamber and the body of the bottle, act to prevent leakage from occurring between the channel and the chamber.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. A cream separator for use with a milk bottle comprising a body portion and an upstanding neck having a channel in one wall and guide means at each side of the channel, and a cover having closures for the channel and for the neck of the bottle respectively, the said separator comprising a bottom wall for closing off the neck from the body portion and an upstanding side wall at one side only, the said wall having means to engage the guide means at either side of the neck of the bottle and close off the channel from the neck.

2. In combination a milk bottle including a body and an upstanding neck having an inwardly open channel, and guides at either side of the channel, a separator device having a bottom for closing off the channel from the neck and an upstanding side wall having edges slidably engaging with the guides and a cover member for the bottle having selectively operable devices for providing an outlet for the neck of the bottle and for the channel.

3. In combination a milk bottle having a body portion and an upstanding neck having an inwardly open channel connecting the body and the mouth of the neck and a groove in the wall of the neck at each side of the channel, a separator device having a bottom wall for closing off the neck from the body and an upstanding side wall slidably engaged in the grooves for closing off the channel from the neck of the bottle and a cover member for the bottle having selectively operable devices for providing an outlet for the neck of the bottle and for the channel.

4. In combination a milk bottle having a body portion and an upstanding neck having an inwardly open channel and a rib projecting outwardly from each side of the channel, a separator device having a bottom wall for closing off the channel from the neck and an upstanding side wall having grooves in its edges for slidably engaging with the ribs and a cover member for the bottle having selectively operable devices for providing an outlet for the neck of the bottle and for the channel.

EMILE SCHEEMAEKER.